Patented May 10, 1932

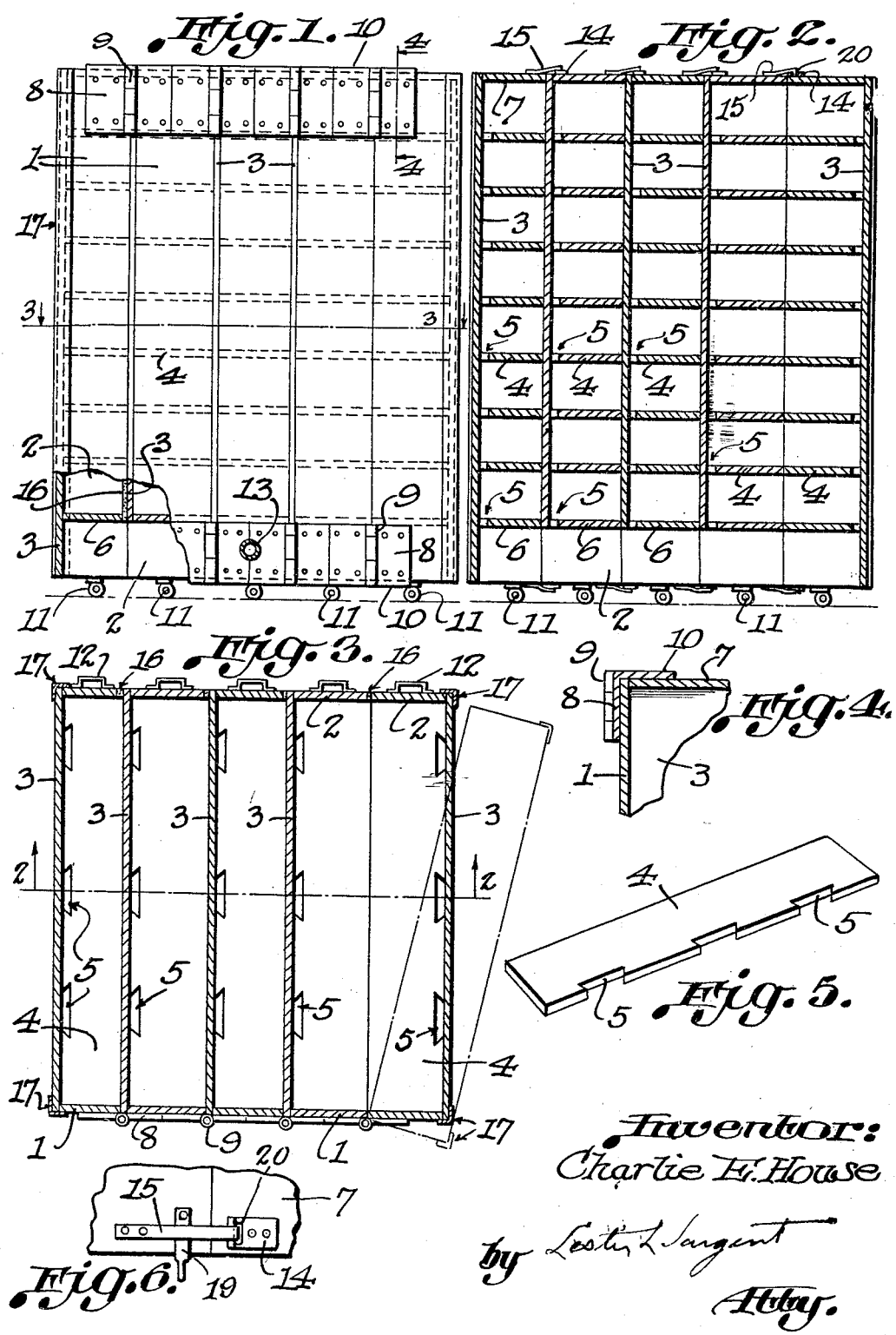

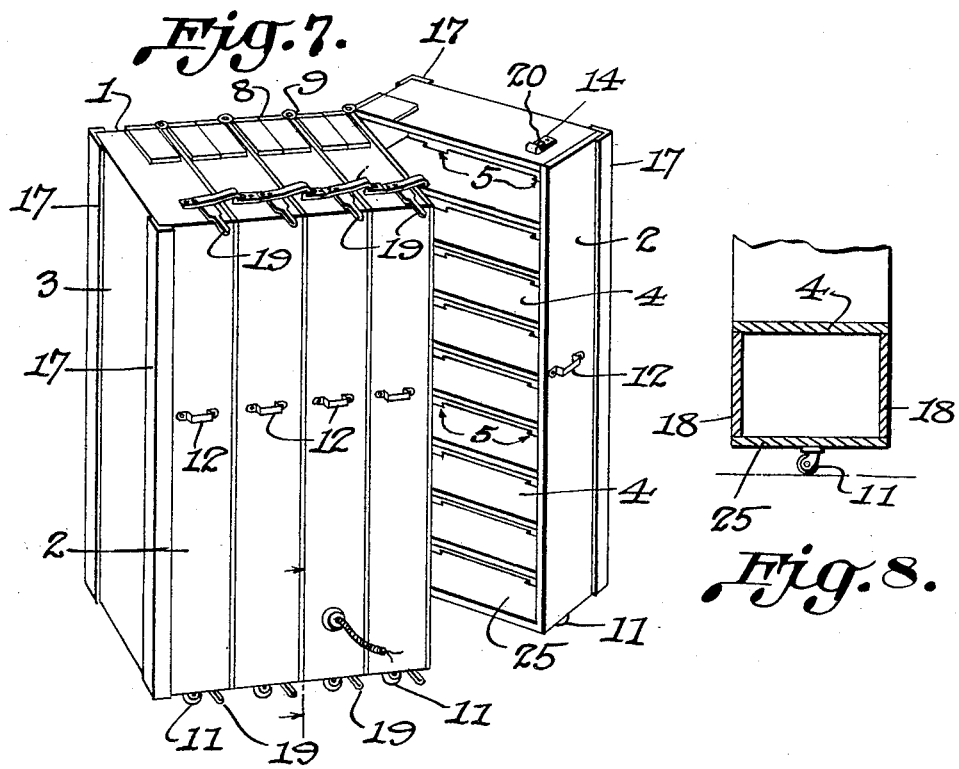
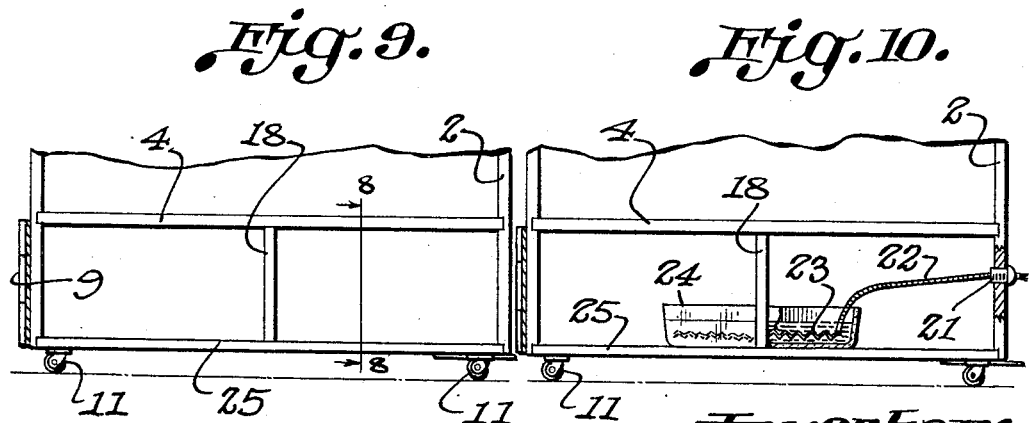

1,858,086

UNITED STATES PATENT OFFICE

CHARLIE E. HOUSE, OF FARMINGTON, IOWA

BAKER'S PROOFING CABINET

Application filed June 17, 1931. Serial No. 545,127.

The object of my invention is to provide a novel baker's proofing cabinet which can be moved about easily, which will occupy little space and which can be brought close to the benches or machines from which the dough is taken.

It is a further object of my invention to provide a cabinet which will not permit of currents of air flowing across the dough to cause it to crust, so that the dough may be molded more correctly either by hand or by machine, and which will result in the production of a more uniform loaf of bread. It is also an object of my invention to provide means for conducting steam into the cabinet and through same. It is a further object of my invention to provide novel means for opening the cabinet. I attain these and other objects of my invention by the mechanism illustrated in the accompanying drawings, in which—

Figure 1 is a rear elevation of the cabinet, a portion being broken away and shown in section;
Fig. 2 is a vertical section of line 2—2 of Fig. 3;

Fig. 3 is a horizontal section on line 3—3 of Fig. 1;

Fig. 4 is a detail sectional view of a portion of the corner of the cabinet;

Fig. 5 is a perspective view of one of the shelves;

Fig. 6 is a detail plan view of the latch;

Fig. 7 is a perspective view of the invention with one section of the cabinet swung part-way open;

Fig. 8 is a transverse section on line 8—8 of Fig. 9;

Fig. 9 is a longitudinal view through the bottom portion of the cabinet; and

Fig. 10 is a view partly in section and partly in side elevation showing means in the cabinet for producing steam.

Like numerals designate like parts in each of the several views.

Referring to the accompanying drawings, I provide a baker's proofing cabinet comprised of a series of cabinet units, each comprising the backs 1, sides 3 and front strips 2. Each of these units is provided with a series of spaced horizontal shelves 4; and each of the shelves is provided with apertures 5 for the passage of steam from one compartment to the other of the cabinet. Each of the cabinet units are provided with hinges 9, the plate portions 8 of which are affixed to the backs of adjoining units of the cabinet so that each unit may be hingedly swung relative to the next adjacent unit. The hinge plates 8 are of L-shape, a portion 10 of the plates extending horizontally over the top of the cabinets and over the bottom of the cabinets as shown in detail in Fig. 4 to function as a reinforcement as well as a hinge. I provide suitable casters 11 on each cabinet unit. Attached to the front 2 of each cabinet unit is a suitable handle 12 as shown in Fig. 3. I provide a steam pipe 13 opening into the steam chamber at the bottom of the cabinets as shown in Fig. 1. On top of the units I provide latches for releasably fastening the units of the cabinet together. Each of these latches consists of a plate 14 having an upturned projection 20 adapted to be releasably engaged by the tongue of a spring latch 15 which spring latch is operated by a handle 19, the latter being suitably raised or swung to lift the tongue of the latch 15 from the projection 20 of plate 14. The various units of the cabinet are provided with felt facings 16 to insure that the cabinets will be air-tight when closed. The corners of the cabinets are provided with vertical L-shaped reinforcing strips 17 as shown in Fig. 1. I may provide suitable braces 18 of wood to give additional support to the bottom of the cabinets.

Each unit of the cabinet has a plurality of shelves, preferably ten, for holding the dough; and each unit of the cabinet is hingedly connected to the other units so that one unit after another of the cabinet can be swung open and loaves placed on the shelves.

The three inside units have short backs as they extend to the lower shelf only. The outside units have full length backs thus forming an open space under all units making a compartment for steam if desired, the steam pipe 13 being disposed to the lower back of the middle unit as shown in the drawings. The angle iron corners or strips 17 afford protection for the cabinet when coming in contact with objects that might mar the cabinet. The felt facings between the units make it possible to effect an airtight closing of the cabinet if desired. The L-shaped hinge plate 8, 10 forms a brace on both the upper and lower corners of the units, thus keeping the units in line and preventing a sagging. The board braces 18 between the bottom shelf and the lower part of the frame prevent warping since the backs of the middle units extend to the lower shelf only. The various apertures 5 in the shelves 4 allow the air or steam to equalize throughout the units of the cabinet when the cabinet is closed.

The cabinet can be used for proofing dough after it has been panned and for this reason provision is made for the admission of steam to the cabinet, and the felt facings are provided to make the units of the cabinet airtight. As the pieces of dough are slightly more sticky at the back when the cabinet is used to proof the dough before molding for the pan, these notches will allow the air to pass upward thus making the surface of the dough the same on both sides of the loaf. The latch handles or catch releases are arranged to project slightly in front of the units so that the top catch can be raised with the hand and the bottom catch pressed down with the toe of the shoe to quickly open the cabinet without having to stoop down.

The units of the cabinet open and close in a manner similar to the leaves of a book when the book is in an upright or vertical position. The casters on each individual unit facilitate the swinging open or closing of the units relative to each other and also facilitate the movement of the entire cabinet from one place to another.

An important advantage of the device is that the cabinet prevents a crust or skin forming on the dough placed in it as currents of air are prevented from passing over the dough due to the several walls of each unit.

The braces or posts 18, as shown in Figs. 8 and 9, support the bottom frame on the inside units inasmuch as they do not have the support of the backs as the outside units have, to prevent warping from weight.

Referring to Figs. 7–10 of the drawings, there is illustrated a pan 24 placed on the bottom 25 of the cabinet. The pan 24 contains water and also contains an electric heating element 23 connected with a source of the electric current by electric wiring 22 which passes through the insulation 21 in the central unit of the cabinet as shown in Figs. 7 and 10. This provides a very practical way of making steam for use in a cabinet of this type especially, as only a small amount of steam will be needed.

What I claim is:—

1. In a baker's proofing cabinet, the combination of a multiple number of cabinet units, each unit being independently mounted on casters, each unit being vertically hinged to the adjacent unit for a swinging movement, the plate portion of the hinge members being of L-shaped and fastened to both the back and top of the cabinet and to the back and bottom of the cabinet to reinforce the walls of the cabinet as well as to function as hinge elements.

2. In a baker's proofing cabinet, the combination of a series of hingedly connected cabinet units, each unit being independently mounted on casters, a multiple number of shelves for each unit forming a series of compartments, each of said shelves having apertures for the passage of air or steam between the several compartments of the cabinet.

3. In a baker's proofing cabinet the combination of a series of hingedly connected cabinet units, each unit being independently mounted on casters, a multiple number of shelves for each unit constituting adjoining compartments, each of said shelves having apertures for the passage of air or steam between the several compartments of the cabinet, the cabinet having an open space at the bottom thereof under all the units, and a steam pipe in communication with said open space for supplying steam to the cabinet, the units of the cabinet having felt facings whereby the cabinet may be closed air-tight.

4. In a baker's proofing cabinet the combination of a multiple number of cabinet units, casters on each of the cabinet units, the several units being vertically hinged, each to the other, at the back of the cabinet for independent swinging movement of the units, spring latches mounted on the top and bottom of the cabinets for latching each unit to the next adjacent unit, each of said latches having an operating handle projecting beyond the edge of the cabinet whereby the latch at the top of the cabinet may be readily released by hand and the latch at the bottom of the cabinet may be readily released by foot to permit the units of the cabinet to be opened.

5. In a baker's proofing cabinet, the combination of a multiple number of cabinet units, each unit being independently mounted on casters, each unit being vertically hinged to the adjacent unit for a swinging movement, a series of shelves in each of the cabinet units, each of said shelves having recessed portions for the passage of steam from one compartment to the compartment above in the several units of the cabinet, and means contained within the bottom compartment of one of the units for producing within the cabinet the steam required.

6. In a baker's proofing cabinet, the combination of a multiple number of cabinet units, each unit being independently mounted on casters, each unit being vertically hinged to the adjacent unit for a swinging movement, a series of shelves in each of the cabinet units, each of said shelves having recessed portions for the passage of steam from one compartment to the compartment above in the several units of the cabinet, a pan of water in the central cabinet unit, a heating element in said pan of water, and means electrically connecting said heating element with a source of electric current whereby steam sufficient for the purposes of the cabinet may be produced within the cabinet.

CHARLIE E. HOUSE.